(12) United States Patent
Moon et al.

(10) Patent No.: US 8,165,919 B2
(45) Date of Patent: Apr. 24, 2012

(54) WEB BASED PRODUCT ORDERING METHOD WITH SHOPPING CARTS ACTIONS QUEUED

(75) Inventors: Jason D. Moon, Plymouth, MN (US); Daniel J. Charbonneau, Chanhassen, MN (US)

(73) Assignee: Digital River, Inc., Minnetonka, MN (US)

( * ) Notice: Subject to any disclaimer, the term of this patent is extended or adjusted under 35 U.S.C. 154(b) by 1294 days.

(21) Appl. No.: 11/694,884

(22) Filed: Mar. 30, 2007

(65) Prior Publication Data
US 2007/0288328 A1  Dec. 13, 2007

Related U.S. Application Data

(60) Provisional application No. 60/787,937, filed on Mar. 31, 2006.

(51) Int. Cl.
*G06Q 30/00* (2012.01)
(52) U.S. Cl. .................... 705/26.1; 705/26.41
(58) Field of Classification Search ............... 705/26.1, 705/26.41, 26.43
See application file for complete search history.

(56) References Cited

U.S. PATENT DOCUMENTS

| | | | |
|---|---|---|---|
| 5,960,411 A | 9/1999 | Hartman et al. | |
| 6,282,517 B1 | 8/2001 | Wolfe et al. | |
| 6,378,075 B1 | 4/2002 | Goldstein et al. | |
| 6,823,359 B1* | 11/2004 | Heidingsfeld et al. | 709/203 |
| 7,106,850 B2 | 9/2006 | Campbell et al. | |
| 7,110,521 B2 | 9/2006 | Lambrigts et al. | |
| 7,181,418 B1 | 2/2007 | Zucker et al. | |
| 7,184,539 B2 | 2/2007 | Colson et al. | |
| 7,461,134 B2* | 12/2008 | Ambrose | 709/217 |
| 2002/0055878 A1* | 5/2002 | Burton et al. | 705/26 |
| 2004/0225922 A1* | 11/2004 | Susarla et al. | 714/38 |
| 2004/0254855 A1* | 12/2004 | Shah | 705/26 |
| 2006/0136564 A1* | 6/2006 | Ambrose | 709/217 |
| 2007/0058793 A1 | 3/2007 | Li et al. | |
| 2007/0198494 A1* | 8/2007 | Vadon et al. | 707/3 |

OTHER PUBLICATIONS

AJAX Programming. Datasheet [online]. Wikipedia Inc. 2007 [retrieved on Apr. 4, 2007]. Retrieved from the internet: <URL:http//en.wikipedia.org/wiki/Ajax_%28programming%29>.
"Google Gets the Message, Launches Gmail." Google Press Center. Datasheet [online]. Google Inc. 2007. [retrieved on Apr. 11, 2007]. Retrieved from the Internet: <URL:http://www.google.com/press/pressrel/gmail.html>.

(Continued)

*Primary Examiner* — Amee A Shah
(74) *Attorney, Agent, or Firm* — North Oaks Patent Agency; Shawn B. Dempster; Lynn M. Holly (57) ABSTRACT

Call center order system and process allows a customer service representative to make remote calls to a server to perform shopping cart actions, all on one web page. Historically, representatives would need to enter client information and product information on several different web pages to satisfy a purchase. Eventually, the representative would have "loaded" several different pages to enter product and customer information. This method resulted in a high amount of errors and increased the risk of fraud. The system utilizes AJAX and dynamic HTML technology. The representative is able to add, update, or remove products in the cart without waiting for the page to "refresh" after every action. Cart actions are flagged with a "ticking" indicator bar. Orders may be placed in a "queue" instead of loading a different page. A mild fraud mode to allow multiple orders is also described. A storefront is used in this process.

12 Claims, 6 Drawing Sheets

OTHER PUBLICATIONS

"AJAX: Not about technology at all." Robert Hoekman, Jr. Blog. Datasheet [online]. Rober Hoekman 2005. [retrieved on Apr. 11, 2007]. Retrieved from the Internet: <URL:http://www.rhjr.net/blog/2005/03/ajax-not-about-technology-at-all.html>.

"Where can you find Flickr and Apple in the same Room? At the AJAX Summit of Course." Boutelle, Jonathan. Datasheet [online]. Silicon Valley Watcher 2005. [retrieved on Apr. 11, 2007]. Retrieved from the Internet: <URL:http://www.siliconvalleywatcher.com/mt/archives/2005/05/where_can_you_f_2.php>.

"Web Standards Project Announces the DOM Scripting Task Force." Webstandards Press Release. Datasheet [online]. Webstandards Inc. 2005. [retrieved on Apr. 11, 2007]. Retrieved from the internet: <URL:http://www.webstandards.org/press/releases/20050718/>.

"Why AJAX Matters Now." OK/Cancel Archive. Datasheet [online]. Okay/Cancel 2005. [retrieved on Apr. 11, 2007]. Retrieved from the Internet: <URL:http://www.ok-cancel.com/archives/article/2005/09/why-ajax-matters-now.html>.

"World's first AJAX Development Environment with JavaScript Synthesis." AJAX Magazine 2005. Datasheet [online]. PHP Magazine Network 2005. [retrieved on Apr. 11, 2007]. Retrieved from the internet: <URL:http://ajax.phpmagazine.net/2005/09/worlds_first_ajax_development.html>.

* cited by examiner

118 — Account Information

* Email Address: [          ]
* Enter a Password: [          ]   Password must be a minimum of 6 characters in length. Please use the characters A-Z and 0-9 only.
* Verify Password: [          ]

120 — Billing Information

Vat Exempt Registration Number: [          ]
* First Name: [          ]
* Last Name: [          ]
Company Name: [          ]
* Address: [          ]
Apt/Suite: [          ]
* City: [          ]
* State: [          ]
* Zip Code: [          ]
* Country: [          ▼]
* Phone Number: [          ]

122 — Shipping Information

Shipping Address: ☑ Same as Billing Address   { Expands if checkbox is not checked (if Shipping Address is different than the Billing Address) }

124 — Payment Information

◉ Credit Card Method
[          ]
Please do not use spaces or dashes.
Example: 4321432143214321

Expiration: Month: [select ▼]   Year: [select ▼]

☑ "Yes! Please keep me informed about product updates, upgrades, special offers and pricing via email."
Your information is safe with us.

☐ "Yes! Please add me to the Symantec direct mailing list to receive info about product updates, upgrades, special offers and pricing."

126 — Wrap-Up

Wrap-Up Code: [Order Placement ▼]   ← Always required
Notes: [          ]

submit — 128

WEB BASED PRODUCT ORDERING METHOD WITH SHOPPING CARTS ACTIONS QUEUED

This application claims the benefit of U.S. Provisional Application No. 60/787,937 filed 31 Mar. 2006, entitled "Call Center Order Tool," which is incorporated herein by reference.

FIELD OF THE INVENTION

This invention relates to technology for managing shopping carts. More particularly, it relates to a software module for administering call center orders.

BACKGROUND OF THE INVENTION

A call center is a centralized office used for the purpose of receiving and transmitting a large volume of requests, usually by telephone. A call center is operated by a company to administer incoming product support or information inquiries from consumers. Outgoing calls for telemarketing, clientele, and debt collection are also made. In addition to a call center, collective handling of letters, faxes, and e-mails at one location is known as a contact center.

Additionally, a call center is often operated through an extensive open workspace for call center agents, with work stations that include a computer for each agent, a telephone set/headset connected to a telecom switch, and one or more supervisor stations. It can be independently operated or networked with additional centers, often linked to a corporate computer network, including mainframes, microcomputers and local area networks (LAN). Increasingly, the voice and data pathways into the center are linked through a set of new technologies called computer telephony integration (CTI).

Most major businesses use call centers to interact with their customers. Examples include utility companies, mail order catalogue firms, and customer support for computer hardware and software. Some businesses even service internal functions through call centers. Examples of this include help desks and sales support.

A call center can be viewed, from an operational point of view, as a queuing network. The simplest call center, consisting of a single type of customers and statistically-identical servers, can be viewed as a single-queue. There is operations research of call centers as well, such as forecasting of calls, determining shift-structures, and for analyzing customers' impatience while waiting to be served by an agent.

The centralization of call management aims to improve a company's operations and reduce costs, while providing a standardized, streamlined, uniform service for consumers, making this approach ideal for large companies with extensive customer support needs. To accommodate for such a large customer base, large warehouses are often converted to office space to host all call center operations under one roof. Centralized offices mean that large numbers of workers can be managed and controlled by a relatively small number of managers and support staff. They are often supported by computer technology that manages, measures and monitors the performance and activities of the workers. Call center staff are closely monitored for quality control, level of proficiency, and customer service. Typical contact center operations focus on the discipline areas of workforce management, queue management, quality monitoring, and reporting. Reporting in a call center can be further broken down into real time reporting and historical reporting. The types of information collected for a group of call center agents typically include: agents logged in, agents ready to take calls, agents available to take calls, agents in wrap up mode, average call duration, average call duration including wrap-up time, longest duration agent available, longest duration call in queue, number of calls in queue, number of calls offered, number of calls abandoned, average speed to answer, average speed to abandoned and service level, calculated by the percentage of calls answered in under a certain time period.

Many call centers use workforce management software, which is software that uses historical information coupled with projected need to generate automated schedules. This aims to provide adequate staffing skilled enough to assist callers. The relatively high cost of personnel and worker inefficiency accounts for the majority of call center operating expenses, influencing outsourcing in the call center industry.

Inadequate computer systems can mean staffs take one or two seconds longer than necessary to process a transaction. This can often be quantified in staff cost terms. This is often used as a driving factor in any business case to justify a complete system upgrade or replacement. For several factors, including the efficiency of the call center, the level of computer and telecom support that may be adequate for staff in a typical branch office may prove totally inadequate in a call center.

Call centers need to use a wide variety of different technologies to allow them to manage the large volumes of work that need to be managed by the call center. These technologies ensure that agents are kept as productive as possible, and that calls are queued and processed as quickly as possible, resulting in good levels of service.

Customer service representatives need a faster and more efficient way to place orders on behalf of a caller, instead of using normal order flow. The present invention provides a solution to these needs and other problems, and offers other advantages over the prior art.

BRIEF SUMMARY OF THE INVENTION

The present invention is related to a software system that solves the above-mentioned problems. In a preferred embodiment, call center order system and process allows a customer service representative (representative) to make remote calls to a server to perform shopping cart actions, all on one web page. Historically, representatives would need to enter client information and product information on several different web pages to satisfy a purchase. For example, a customer would contact a call center and speak to a representative. The representative, in turn, would first select a product in either a web page or dialog box. Next, the representative would move to several different pages to enter customer information such as address and shipping data. Eventually, the representative would have "loaded" several different pages to enter product and customer information. This method resulted in a high amount of errors and increased the risk of fraud, affecting company sales and customer satisfaction.

Call center order system and process, on the other hand, utilizes AJAX technology to perform the shopping cart actions. These shopping cart actions may be for several different types of products such as physical goods, electronically downloadable software, video or music, as well as services such as conference registrations, repair requests, reservations, or the like. AJAX, shorthand for Asynchronous JavaScript and Extensible Markup Language (XML), is a web development technique for creating interactive web applications. The intent is to make web pages feel more responsive by exchanging small amounts of data with the server behind the scenes, so that the entire web page does not have to be reloaded each time the user, or representative, requests a change. This is meant to increase the web page's interactivity, speed, and usability.

Again in a preferred embodiment of call center order system and process, all products are initially loaded into dropdown lists when the page is first loaded. When the user changes product categories, the dropdowns are re-built using JavaScript to filter the list for only that selected category. The representative is able to manipulate the shopping cart (e.g., add, update, or remove products in the shopping cart) without waiting for the page to "refresh" after every action. Furthermore, all cart actions are flagged with a "ticking" indicator bar for the split-second that the request goes to the server and back. In this way, product orders and requests may be placed in a "queue" instead of loading and refreshing a different page for each product. Finally, call center order system and process enables the site to switch to Mild Fraud mode and allows multiple orders to be placed from a single IP address. A storefront is used in this process and all products and promotions present within the store are available for the representative to make a purchase on behalf of the customer.

Additional advantages and features of the invention will be set forth in part in the description which follows, and in part, will become apparent to those skilled in the art upon examination of the following or may be learned by practice of the invention.

DETAILED DESCRIPTION

In a preferred embodiment, call center order system and process allows a customer service representative (representative) to make remote calls to a server to perform shopping cart actions, all on one web page. Historically, representatives would need to enter client information and product information on several different web pages to satisfy a purchase. For example, a customer would contact a call center and speak to a representative. The representative, in turn, would first select a product in either a web page or dialog box. Next, the representative would move to several different pages to enter customer information such as address and shipping data. Eventually, the representative would have "loaded" several different pages to enter product and customer information. This method resulted in a high amount of errors and increased the risk of fraud, affecting company sales and customer satisfaction.

Call center order system and process, on the other hand, utilizes AJAX technology to perform the shopping cart actions. AJAX, shorthand for Asynchronous JavaScript and Extensible Markup Language (XML), is a web development technique for creating interactive web applications. The intent is to make web pages feel more responsive by exchanging small amounts of data with the server behind the scenes, so that the entire web page does not have to be reloaded each time the user, or representative, requests a change. This is meant to increase the web page's interactivity, speed, and usability.

Again in a preferred embodiment of call center order system and process, all products are initially loaded into dropdown lists when the page is first loaded. When the user changes product categories, the dropdowns are re-built using JavaScript to filter the list for only that selected category. The representative is able to add, update, or remove products in the shopping cart without waiting for the page to "refresh" after every action. Furthermore, all cart actions are flagged with a "ticking" indicator bar for the split-second that the request goes to the server and back. In this way, product orders and requests may be placed in a "queue" instead of loading and refreshing a different page for each product. A storefront is used in this process and all products and promotions present within the store are available for the representative to make a purchase on behalf of the customer.

Call center order system and process relies on the domain to remain the same throughout the purchase process. In many instances a storefront may have hard coded URLs which switch the representative to an incorrect domain. Ultimately the representative is inadvertently placing orders outside of the test site. Thus the representative will be in a high fraud mode just like any regular customer and will encounter may fraud errors. Accordingly, call center order system and process enables the site to switch to Mild Fraud mode and allows multiple orders to be placed from a single internet protocol (IP) address.

Figure 1:
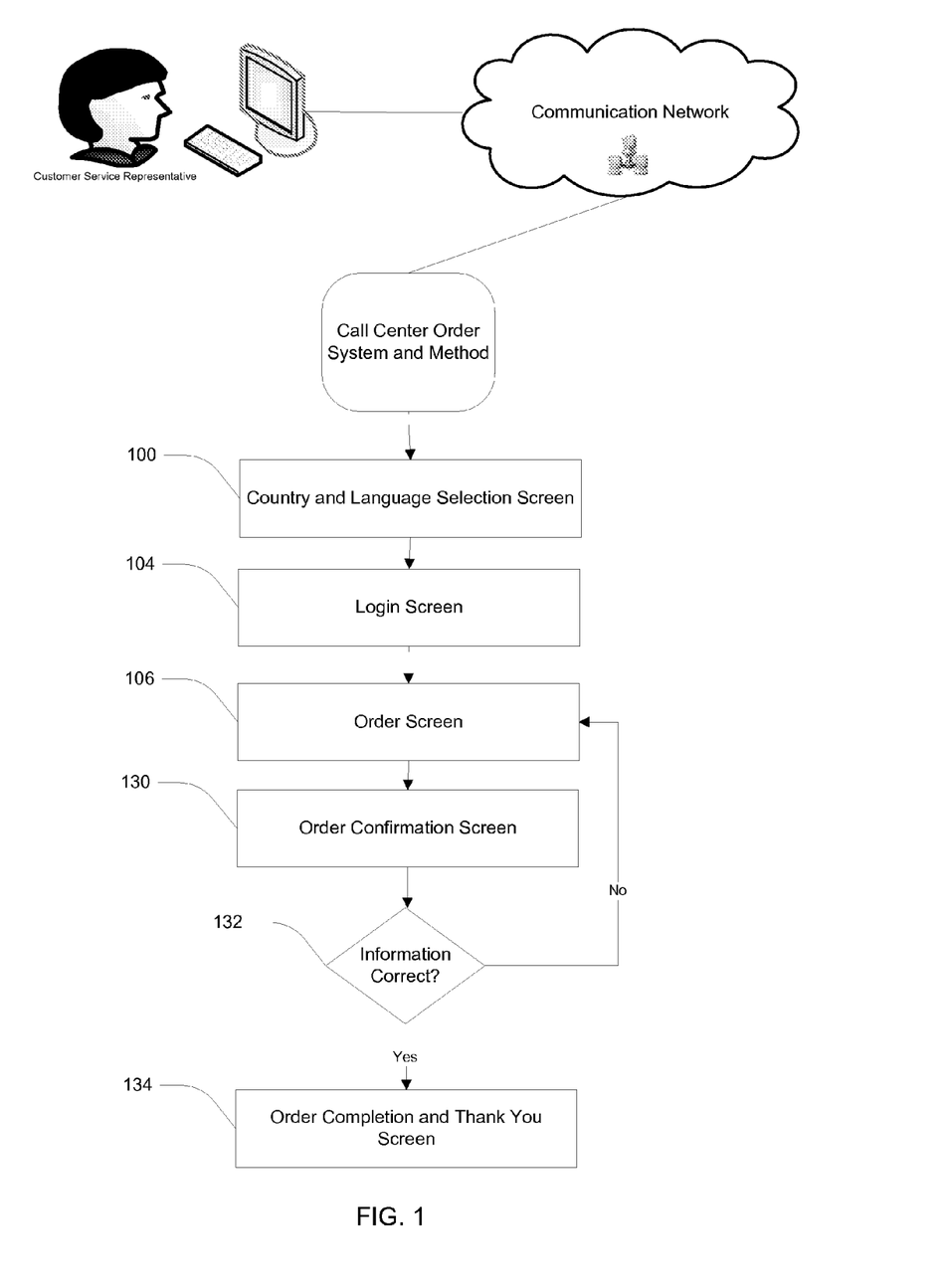
FIG. 1 shows an overview diagram of call center order system and process.

FIG. 1 describes an overview diagram of call center order system and process. First, a representative will select a customer's country and language 100, where all pricing, offers, currencies, and payment methods are displayed based on the selections. A country language selector page 102 (described in FIG. 2) can be updated with new countries and languages as additional security identifiers are created.

Referring again to FIG. 1, once the country has been selected the system will check to see if the representative is already logged in and then will display a pertinent login or order page. The representative will login 104 using client identifications and passwords on a login page 105. It will be understood by one of ordinary skill in the art that the representative will login 104 using a user name, password, and validation requirements. It will be further understood that the call center order system and process utilizes a graphical user interface (GUI). A GUI allows for interaction with a computer or other media formats which employ graphical images along with text to represent the information and actions available to a user. The actions are usually performed through direct manipulation of the graphical elements. Passwords expire after a preferred time period which is set by default by the representative and/or a provider of call center order system and process. It will be appreciated by those skilled in the art that other GUIs could be developed that provide the same functionality while not departing from the scope and spirit of the present invention.

The next step in the overview diagram of call center order system and process is an "Order Screen" 106 section. Here, a product is selected, a shopping cart is managed, and an authorization page is edited. Next, in an "Order Confirmation" 130 step, the representative confirms the information entered in "Country and Language Selection" 100, "Login" 104, and "Order Screen" 106. Thereafter, if the information is correct 132, the customer service representative will be directed to an "Order Completion and Thank You" 134 page. If the information is not correct, then the representative may re enter and re-submit the items listed in the above steps.

Figure 2:
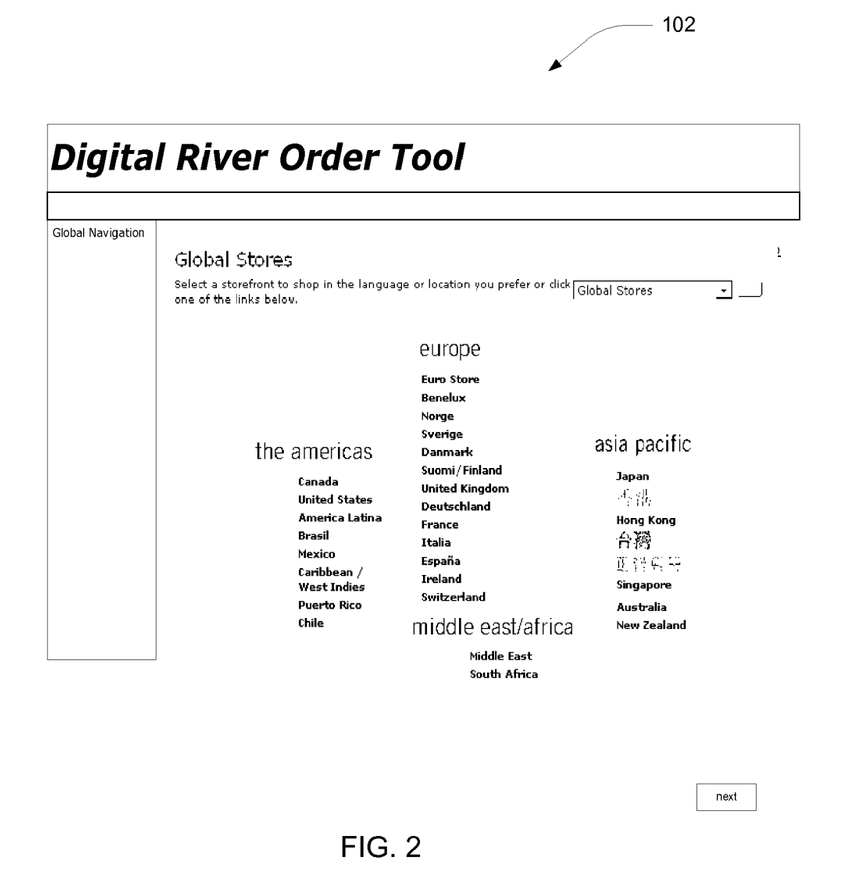
FIG. 2 describes a "Global Store" graphical user interface.
Figure 3:
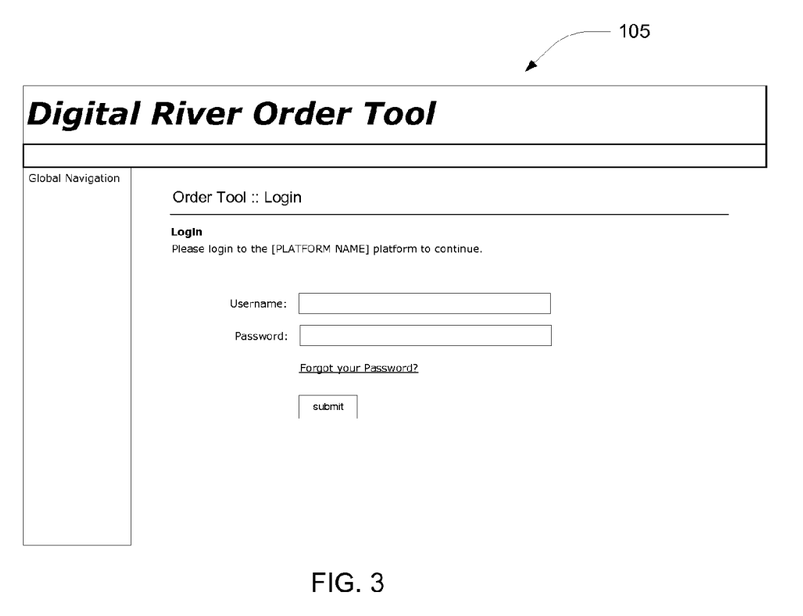
FIG. 3 illustrates a login page for call center order system and process.

FIG. 2 illustrates a country language selector page 102. Here the representative chooses a storefront in a language and country they desire. The representative may choose from several links or may choose from a drop down menu. Furthermore, an "Order Tool Login" 105 page is illustrated in FIG. 3. Here the representative enters a username and password to login to the system.

Figure 4:
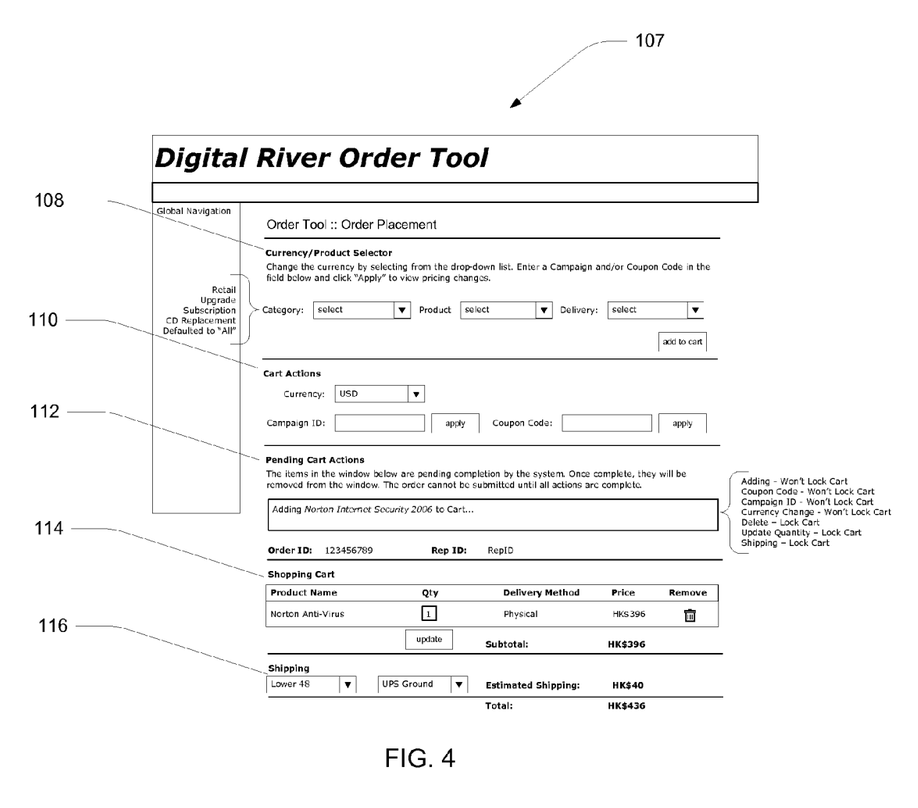
FIG. 4 illustrates an order placement page.

Referring now to FIG. 4, an order placement screen 107 is shown. The representative may choose a currency and product under "Currency/Product Selector" 108. It will be understood by one of ordinary skill in the art that "Currency/Product Selector" 108 is a drop down menu. A drop down menu is a menu whose title is normally visible but whose contents are shown only when the user activates it, normally by clicking on the title or a small arrow next to the title, whereupon the menu items appear below the title. The user may select an item from the menu by dragging the mouse from the menu title to the item and releasing, or by clicking the title and then clicking the item. It will further be understood that drop down menus are used in various aspects of the call center order system and process.

When the representative clicks on a category under "Currency/Product Selector" 108, the next drop down menu, such as product, will be repopulated with items specific to that category. Categories may include but are not limited to: retail, upgrade, subscription, compact disk (CD) replacement, and default items. The same repopulation applies to a deliver drop down menu. It will be understood by one of ordinary skill in the art that selecting an item in one drop down menu filters the next drop down menu.

Next, the representative may select a "Cart Action" 110. Here a currency type, campaign ID, and coupon code may be applied. Under "Pending Cart Actions" 112, the items that are pending completion are shown. All cart actions are flagged with a "ticking" indicator bar for the split-second that the request goes to the server and back. In this way, product orders and requests may be placed in a "queue" instead of loading and refreshing a different page for each product. For example, a representative may add several products together very quickly as the customer requests. The products will thus be lined up in a queue in the "Pending Cart actions" 112 section. This way the shopping cart will not "freeze" and the representative may safely and securely order several products without any need to refresh and reload pages. Conversely, if the representative attempts to delete an item in queue, the shopping cart will automatically lock. This ensures that the representative will not make any mistakes in updating or deleting orders and forces the representative to wait until the orders have gone through the queue. The system displays a message that the product is being added to the cart and locks the cart from further action. Once the item has been added to the cart, the message is removed, the cart is unlocked, and order IDs and representative name fields are populate. It will be understood by one of ordinary skill in the art that product are often bundled together, thus if a representative attempts to delete a product in queue, the related products may also be affected.

Furthermore, under "Shopping Cart" 114, the product(s) are listed along with quantity, delivery method, price, and ability to remove the item. It will be understood that "Shopping Cart" 114 is the actual cart where orders are placed once they move through the "Pending Cart Actions" 112 section. "Shopping Cart" 114 is continually refreshed without the representative needing to manually refresh the page. The representative also does not have to click or load another page to see the shopping cart with the current ordered products. Here, AJAX technology and also dynamic HTML may be used. Also, the representative may click on a trash can to dispose of an item. "Shipping" 116 menu allows the customer service representative to choose the destination and method of shipment. The method will be limited based on the selected product.

Figure 5:
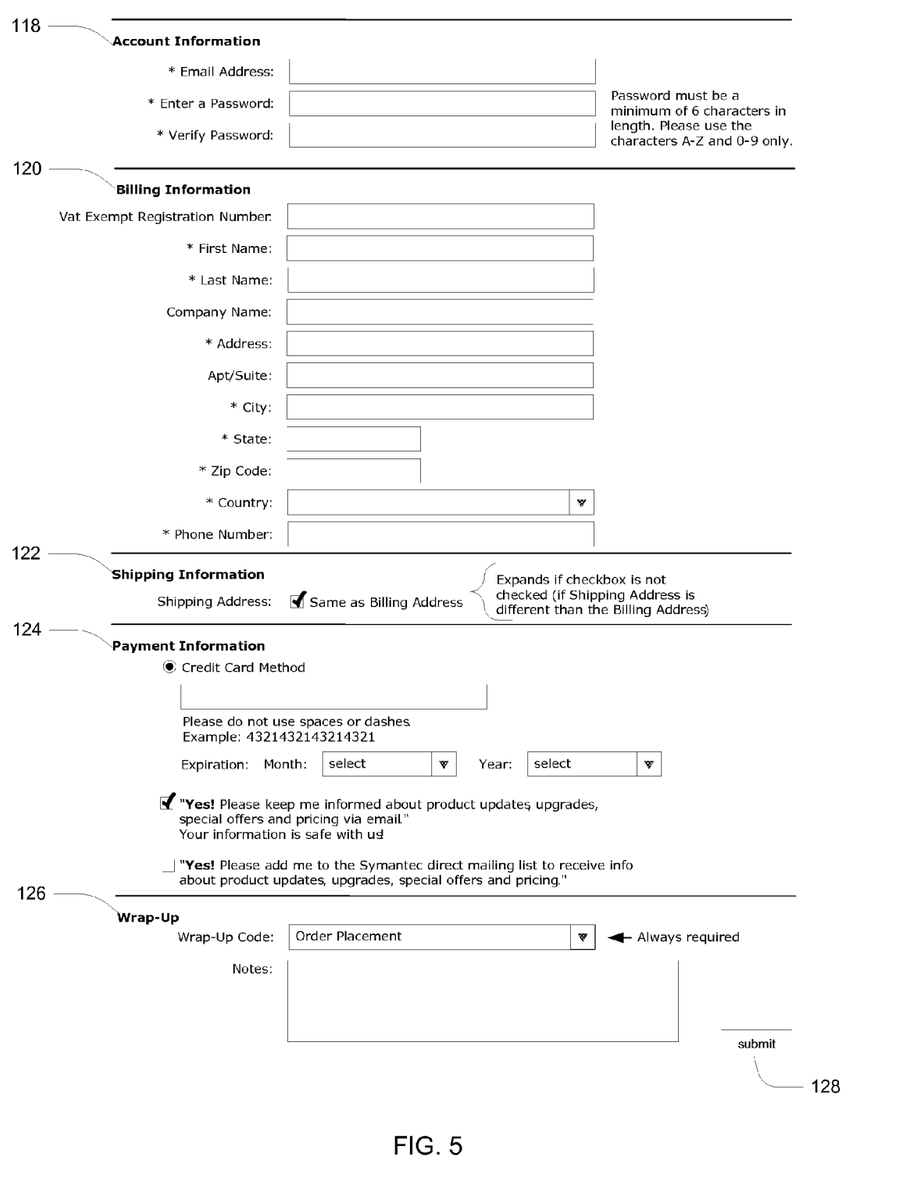
FIG. 5 further illustrates the order placement page from FIG. 4.

Referring now to FIG. 5, the order placement screen of FIG. 4 is further explained. An "Account Information" 118 section is where email address, password, and password verification is entered. The representative may enter information into a "Billing Information" 120 section, such as registration numbers, names, company names, addresses, and phone numbers. Also, under "Shipping Information" 122 a shipping address may be chosen. And, under "Payment Information" 124 a method of payment can be elected. Finally, under "Wrap-up" 126 the representative may elect a wrap-up code and any additional notes. It will be understood that these codes are the standard call center codes for explaining the representative's actions in a call, such as any site issues, customer complaints, and online error codes. Clicking "Submit" 128 places the order. The system will display an error message if particular fields need to be completed. The representative then reviews the information, determines that a change is required and then goes back to the previous page. The system will then display a thank you page and the process is complete.

Figure 6:
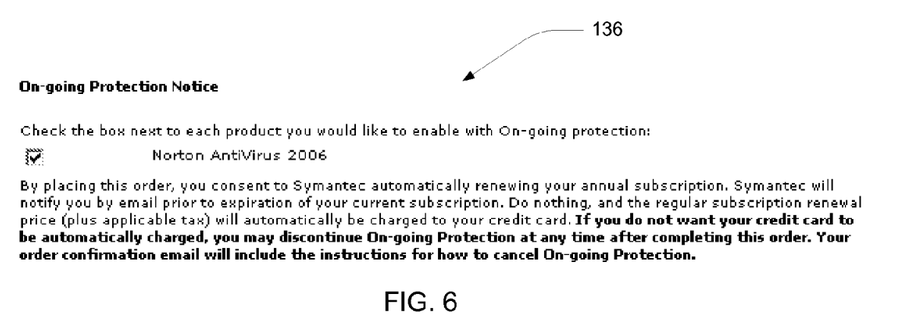
FIG. 6 shows an example of an "Ongoing Protection Messaging" that displays for eligible products.
Figure 7:
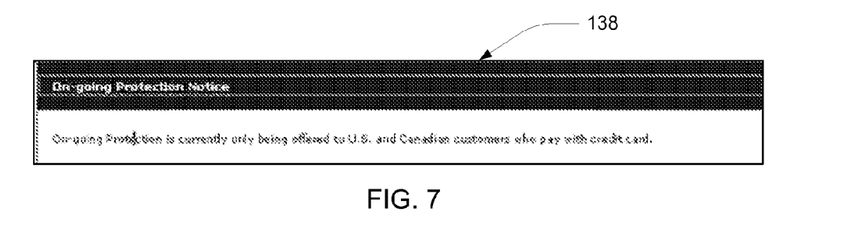
FIG. 7 shows an ongoing protection notice.

FIG. 6 shows an example of an "On-going Protection Notice" 136 that displays for eligible products when the country is the United States or Canada and credit card payment method selected. It will be appreciated by those skilled in the art that FIG. 6 is an example of an "up sale" opportunity for a product that may be presented to a customer; however other "up sale" opportunities could be readily substituted for this one without departing from the scope and spirit of the present invention. Alternatively, FIG. 7 shows an example of an ongoing protection message 138 that displays for eligible products when a non-credit card payment method is selected or the country is not United States or Canada. All products and promotions present within an online store are available for the representative to make a purchase on behalf of a customer. Promotion pricing may be chosen by entering and applying an appropriate campaign identification code (ID). Furthermore, it will be understood that all wrap up codes and reporting will be viewable, and all payment options will be customizable by client site ID. Standard address verifications may be implemented as well as an auto renewal check box for payment options.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different dialog boxes are presented to a user that are organized or designed differently while maintaining substantially the same functionality without departing from the scope and spirit of the present invention.

What is claimed is:

1. A method for ordering a product through a web-based interface over a network, comprising steps of:
   loading an order placement web page with all product items as the web-page is first loaded by a computer, the order placement web page including a shopping cart and providing an interface to a purchase order system;

obtaining information about a purchase order of a product from a user by selecting product information from the order placement web page;

repopulating product items in a menu specific to a category on the order placement web page based on the user selecting that category;

queuing a first and second shopping cart action for the shopping cart into a pending cart action queue based on the user selecting shopping cart actions; and updating the shopping cart portion of the order placement web page based on the queued shopping cart actions without loading and refreshing the entire order placement web page.

2. The method of claim 1 further comprising a step of submitting the purchase order for the product.

3. The method of claim 1 further comprising steps of:
sending the first and second shopping cart actions utilizing dynamic hypertext markup language to a server; and
receiving updated shopping cart information from the server.

4. The method of claim 3 wherein the updating step comprises utilizing dynamic hypertext markup language to update only the shopping cart portion of the order placement web page whereby the entire web page is not reloaded while the product option information is updated on the purchase order web page.

5. The method of claim 3 wherein the dynamic hypertext markup language comprises Asynchronous JavaScript and Extensible Markup Language (AJAX).

6. The method of claim 1 further comprising a step of entering additional information into the purchase order web page subsequent to updating the shopping cart portion of the order placement web page.

7. The method of claim 3 wherein the queuing step comprises acting by the server upon the actions in the pending cart action queue prior to submitting a purchase order for the product.

8. The method of claim 7 wherein the queuing step comprises locking the shopping cart from other entry of information while the server acts upon the action.

9. The method of claim 7 wherein the queuing step comprises not locking the shopping cart from other entry of information while the server acts upon the action.

10. The method of claim 1 wherein the order placement web page comprises a single web page and the loading step comprises providing the interface to the purchase order system as the single order placement web page including product selection, product quantity, and payment information.

11. The method of claim 1 wherein the order placement web page comprises a single web page and the loading step comprises providing the interface to the purchase order system as the single order placement web page including customer service wrap up codes.

12. The method of claim 1 wherein the order placement web page comprises a single web page and the loading step comprises providing the interface to the purchase order system as the single order placement web page including an "up sale" opportunity of a product for a customer.

* * * * *